March 31, 1964 L. D. HARMON 3,127,588
AUTOMATIC READING OF CURSIVE SCRIPT
Filed April 24, 1959 2 Sheets-Sheet 1
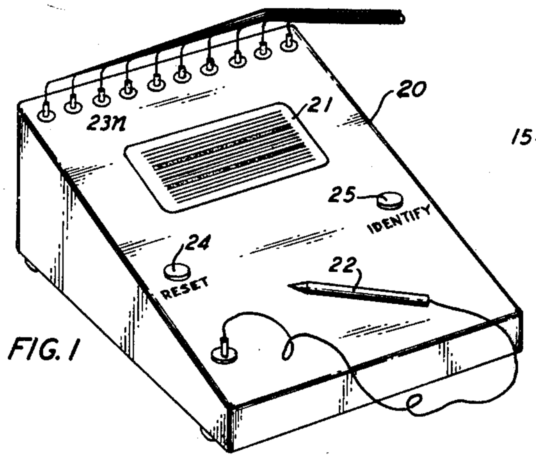
FIG. 1
FIG. 2
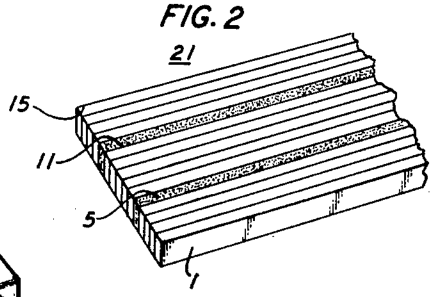
FIG. 3
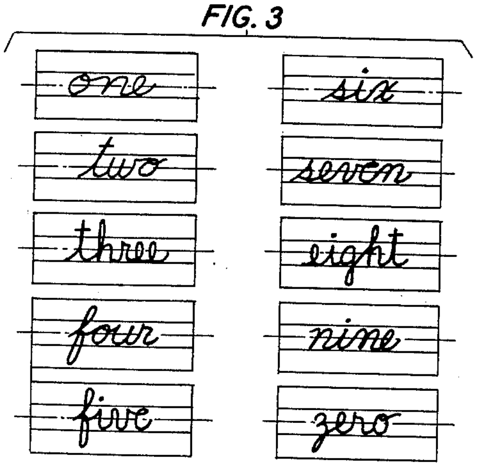
FIG. 4
TESTS
| WORD ENSEMBLE | A | B | C | D | E | F |
|---|---|---|---|---|---|---|
| ZERO | 1 | — | 0 | 0 | — | — |
| ONE | 0 | 0 | 0 | 0 | 0 | — |
| TWO | 0 | 0 | 1 | — | — | 0 |
| THREE | 0 | 0 | 1 | — | — | 1 |
| FOUR | 1 | — | 1 | 0 | — | — |
| FIVE | 1 | — | — | 1 | — | — |
| SIX | 0 | 0 | 0 | 1 | 0 | — |
| SEVEN | 0 | 0 | 0 | 0 | 1 | — |
| EIGHT | — | 1 | — | — | — | — |
| NINE | 0 | — | 0 | 1 | 1 | — |
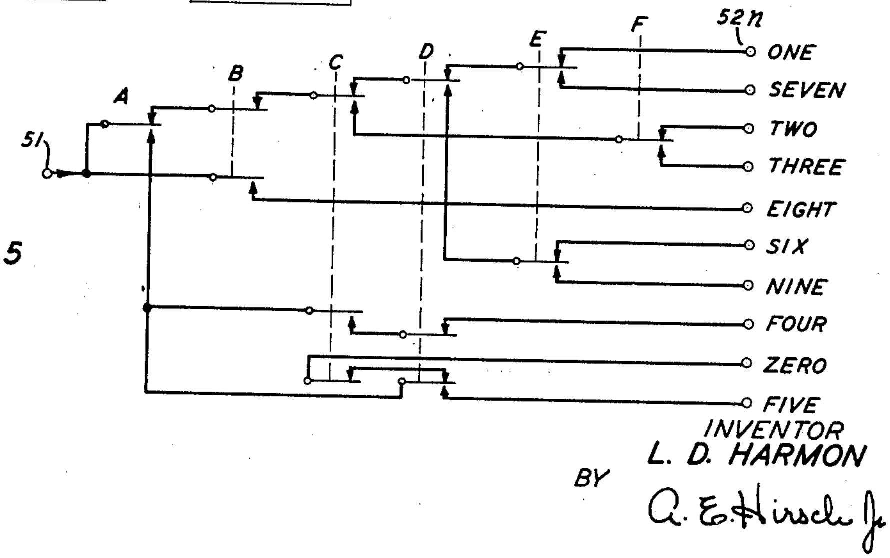
FIG. 5
INVENTOR
L. D. HARMON
BY A. E. Hirsch Jr.
ATTORNEY INVENTOR
L. D. HARMON
BY A. E. Hirsch Jr.
ATTORNEY United States Patent Office 3,127,588
Patented Mar. 31, 1964

3,127,588
AUTOMATIC READING OF CURSIVE SCRIPT

Leon D. Harmon, Plainfield, N.J., assignor to Bell Telephone Laboratories, Incorporated, New York, N.Y., a corporation of New York Filed Apr. 24, 1959, Ser. No. 808,827
14 Claims. (Cl. 340—146.3)

This invention relates to the automatic recognition and identification of two-dimensional figures, and more particularly to apparatus for automatically recognizing and classifying cursive script.

A principal object of the invention is the automatic translation of cursive script depicting patterns such as words or the like into a form suitable for utilization in automatic printing equipment such as electrically operated typesetters and typewriters, or into a language capable of being utilized directly in the control of computer or data processing equipment. More specifically, its object is to provide apparatus for automatically converting patterns representative of human language into what may be termed machine "language" for the purposes of communicating with machines or with other humans.

Present approaches to automatic visual recognition of patterns are found in so-called printed character readers and line drawing recognition machines. Automatic character readers and recognition machines are generally provided with a sensing element or elements for interrogating each character under analysis, as by scanning, to produce signals which may be analyzed for essential features necessary to a classification of the character. For example, in the automatic character analyzer described in my copending application, Serial No. 795,649, filed February 26, 1959, now U.S. Patent No. 3,050,711, issued August 21, 1962, a character is examined by means of a dilating circular scan progressively from a point near the center of the pattern outwardly past its boundary limits. Signals produced as the scanning trace interrogates various portions of the character are registered to provide an electrical indication of the spatial location of the point. The registered signals are classified according to a schedule in which the topological relations between elements provide a unique identification of the character.

While devices of this sort provide rapid and accurate translations from machine-printed or hand-printed language into machine language, it is, nevertheless, evident that the translation is made on a character-by-character basis. Oftentimes, however, translation efficiency can be considerably improved if full words in the English language, for example, are recognized immediately. The provision of additional apparatus necessary to perform a second analysis, i.e., an interrogation of previously translated sequences of characters to detect words, presents substantial technical and economic difficulties. On the other hand present techniques for translation of handwritten words into an acceptable machine language requires considerable human effort and is subject to human mistakes.

It is often desirable, for continuous handwritten script, such as a plurality of alphabetical characters written in cursive or connected fashion, to be identified automatically. Machines that rely on discrete isolation of the characters in the alphabet under examination obviously fail to respond to cursive writing of this sort. Furthermore, present machines respond only to hand or machine printed characters and not to written or script characters.

Another class of machines for transforming line patterns directly into an artificial language is found in the telautograph art. Here the conversion is from human language, as manifest in the transfer of human thought to a written form, to analog form, e.g., electrical signals indicative of the X and Y coordinate positions of the instantaneous position of a stylus on a platen. In general, however, these electrical signals must be translated into yet another form before their significance can be realized.

The present invention takes as its starting point the view that instructions for machine operations or the like can often best be accumulated and transcribed for use if the intermediate processing between the human being originating the instructions and the ultimate recipient is made as fully automatic as possible. In particular, instructions written in the English language by an operator, for example, should be automatically translated from the dictionary meaning of individual words themselves into the corresponding machine language equivalent. A machine for examining the written instructions and performing the translation, by circumventing the time-consuming and error-prone intermediate steps of typewriting, key punch operating and the like, constitutes a virtually error free input device. Moreover, the accuracy in transmitting the information to another human operator can be substantially improved by this means. While it is true that a translation operation in real-time is limited to speeds commensurate with the writing speed of the operator, the freedom from error afforded thereby is of substantial significance.

It is a particular object of the present invention to perform real-time translations of handwritten cursive script or script type on a word-by-word basis into a form directly acceptable by a large class of machines.

In general, these objects are attained in the present invention by extracting from cursive patterns such as an ensemble of English words, specified invariant features sufficient to provide a unique identification of each of the words in the ensemble. Words or patterns to be translated are written by an operator with a wired stylus on a transducer surface, and signals derived from the surface are processed in real-time by a sequential-logic circuit. From a few limits imposed upon the writer by the platen configuration, binary decisions based on the overall word shape, i.e., the word envelope, the presence of special marks and the complexity of the word, are made which are sufficient to identify each word in the ensemble. It is unnecessary therefore to distinguish individual letters or characters in the identification process.

The invention, together with other objects and features and its various advantages, will be more fully apprehended from the following detailed description of preferred illustrative embodiments thereof taken in connection with the appended drawings in which:

FIG. 1 is a drawing showing a geometrical disposition of a transducer for translating cursive script into coded electrical signals in accordance with the invention;

FIG. 2 is a drawing illustrating the construction of a typical writing platen suitable for use in the practice of the invention;

FIG. 3 shows various representative cursive script patterns respectively positioned on representative writing fields helpful in an understanding of the invention;

FIG. 4 is a tabulation of the combinations of representative features found in an alphabet of decimal digits;

FIG. 5 is a schematic diagram of a relay tree connected in a fashion to implement the tabulations of FIG. 4.

Figure 6:
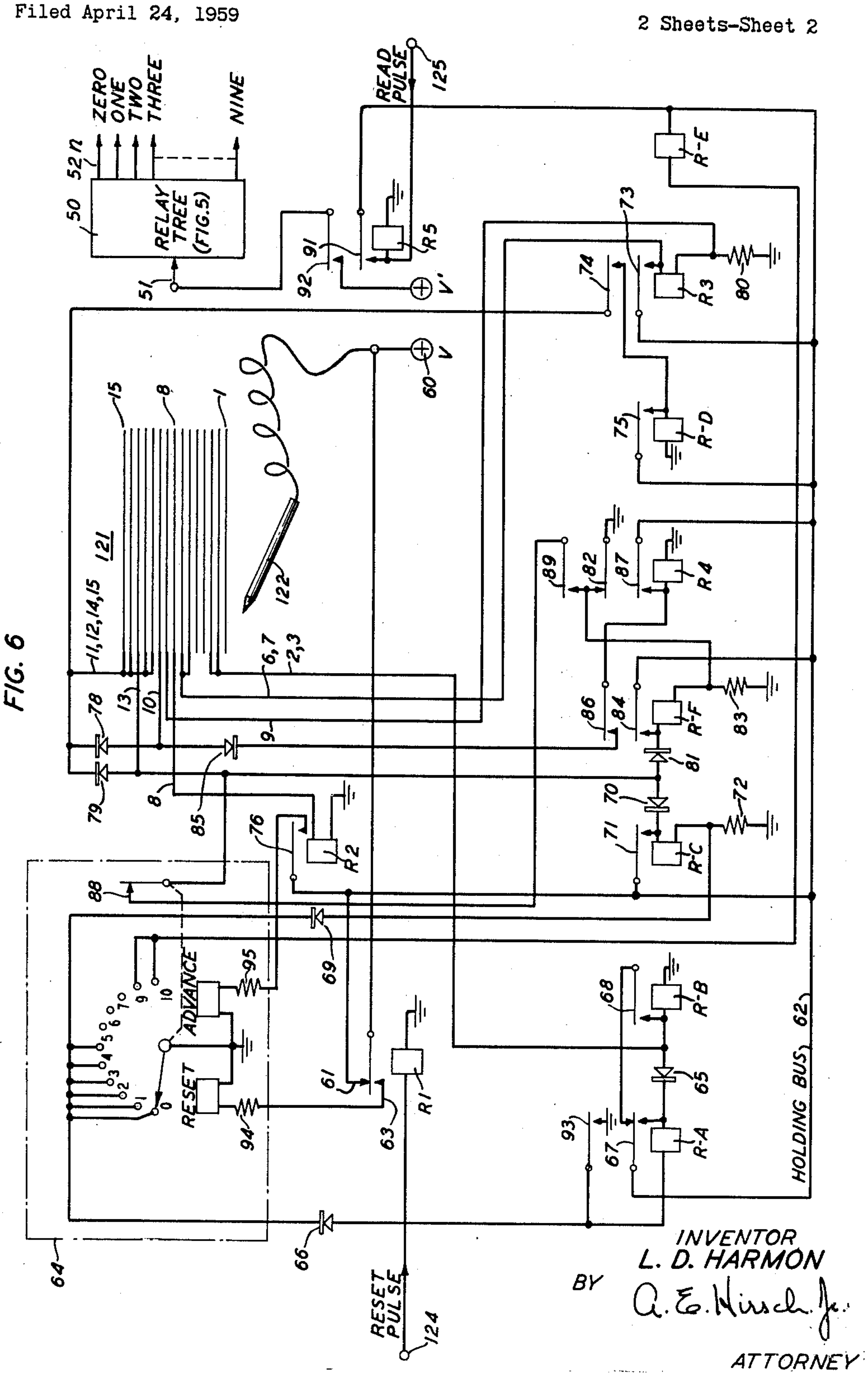
FIG. 6 is a schematic circuit diagram of apparatus for analyzing cursive script into machine language in accordance with the invention.

Referring now to the drawings, FIG. 1 shows a transducer for translating cursive script into a plurality of electrical signals. Writing platen or tablet 21 is supported in a typical operating position by means of a base or desk 20. Real-time signals are produced as a wired electrified stylus 22 is moved over the writing surface 21 which comprises a segmented commutator-like surface. Typically, it may comprise fifteen laminated striations of a conductive material, separated by thin boundaries of a suitable insulating material.

The details of a portion of such a striated writing surface are illustrated in FIG. 2. It may be formed of fifteen conductive bars, for example, suitably insulated one from another to constitute a writing area approximately one inch high and two or three inches in length. Two guide lines are provided to serve as a visual indication of the acceptable writing area for various script portions. Conveniently, the guide lines are co-extensive with two of the striae, e.g., striae numbers five and eleven, and run substantially the entire length of the platen. The lines may comprise a conductive colored material or the like coated or painted on the bars. Preferably, guide striae are formed of a conductive material whose appearance is different from the other conductive bars in the platen. Thus, if copper strips are used for the commutator bars of the writing surface, the indicator bars five and eleven may be formed of brass or the like.

Referring once again to FIG. 1, the bars of the writing surfaces are independently connected to the several input points in a logic decision circuit. The logic circuit, which preferably follows the arrangement to be described hereinafter with reference to FIGS. 5 and 6, may be conveniently contained entirely within the base 20. A battery powered unit thus becomes ideal for use as a portable subset which may be positioned at any desired location, for example, near the input of the apparatus with which it is to be used. The outputs of the decision circuit may be brought out to a number of terminals **23*n* mounted on the base 20. Alternatively, the logic decision elements may be centrally located as, for example, when used with a number of remote writing platens. In this case the commutator bar and stylus conductors may be brought out through terminals on the base 20** and carried in a cable to the equipment center.

In operation, the logic elements are first cleared electrically with a suitable reset pulse or the like. This pulse may be derived directly from the apparatus with which the automatic script reader is associated or directly by the writer before entering a word on the platen. Conveniently the reset pulse may be derived from the stylus 22 by applying it momentarily to a terminal 24 mounted on the base 20 and connected electrically to a reset bus in the logic circuit. Once a complete word as, for example, an English word taken from a selected word collection has been written on the surface, the logic decision elements are interrogated to provide on one of the output leads **23*n* a signal corresponding to the identity of the written word. A suitable identify request pulse derived from the controlled machine may be used for this purpose. In the illustrative desk model illustrated in FIG. 1 an identify request pulse may be derived by applying stylus 22 momentarily to the terminal 25** which is connected to an identify bus in the logic circuit.

The marker bars five and eleven extending longitudinally in the writing surface 21 provide visual constraints to be followed by an operator in writing a word on the tablet. FIG. 3 illustrates the manner in which the ten decimal digits, selected as a typical word ensemble or "alphabet," are written within these constraints. All that is required is that the writer consider the indicator bars as guide lines as in a ruled writing tablet and confine all lower case "small" letters, e.g., *e, i, n* and *o*, to the space between the guides; allows all vertical extensions on such letters as *t* and *h* to extend above the upper guide line; and position all letters with lower extensions such as *g* and *z* so that the extremities occupy the sector below the lower guide line. Dots appearing over *i*'s and crosses on *t*'s should also fall in the upper sector, i.e., above the upper guide line.

Recognition of the identity of a word written in this fashion is based on the time sequence during which line portions of the individual letters of the words are drawn in terms of the spatial position of the lines in a direction transverse to the commutator striae only. Thus, although the writing tablet has transverse resolution only, the time sequence in which the various line portions of words are applied to the tablet supplies the necessary longitudinal resolution. For a limited collection of words, the absence of longitudinal resolution presents no problem inasmuch as sufficient information is ordinarily available to permit a unique identification of each of the words. It is a distinct advantage since it permits the operator to enjoy great freedom in his choice of letter forms. However, for a more extended "alphabet," one including longer and more complex words, additional longitudinal resolution is afforded by suitably segmenting the commutator bars at spaced intervals and providing an individual electrical connection to each segment so formed.

From an examination of the collection of words illustrated in FIG. 3 certain essential differences in the formation of the words can be observed. These differences are sufficient to enable apparatus to be constructed for uniquely recognizing and identifying the words when written on the transducer of FIG. 1. For example, the numbers *one, six, seven* and *nine* are distinct from all others in that they are comprised solely of small letters, i.e., letters lying within the constraining guide lines. Numbers *two, three, four, five* and *eight* have vertical extensions above the upper guide line, while numbers *four, five, eight* and *zero* have extensions below the guide line. Transverse extensions may occur, however, at the left, in the middle or at the right portion of the word. They occur at the left in *two, three, four, five* and *zero*; in the middle for *eight* and also at the right for an *eight*. The words *five, six, eight* and *nine* have dotted letters and the words *two, three, six* and *eight* possess crossed letters. Additionally, it is observed that the number of times the centermost commutator bar is crossed in writing the words varies from one word to another. Considering the center conductive bar as an arbitrary zero axis, the number of zero crossings produced supplies an additional distinguishing feature among the words. For example, the axis crossing count for the word *one* is typically seven or eight and for the word *seven* is eleven or twelve. Other and different counts exist for other words in the collection.

The information obtained from these observations is sufficient to give adequate separation of the ten words in the ensemble. Theoretically 3.3 binary decisions are the minimum number sufficient for uniquely separating the ten words, but practically, four becomes the fewest that can be used. In practice, five bits have proven satisfactory. With five bits of logic, the words *two* and *three* are separated not by the number of top left extensions that occur in the word, but instead on the number of axis crossings encountered. However, because of the great variability in writing styles, the system profits from some redundancy. Accordingly, a six bit logic system is preferred. In particular, the second top left extension criteria are preferably employed to increase accuracy and minimize errors.

Operating rules for distinguishing between an ensemble consisting of the ten decimal digits, utilizing the principles set forth above, are tabulated in the table of FIG. 4. For each of the words indicated at the left of the table, six tests labeled A through F are provided. They indicate the presence in the collection of words of characteristic features as follows:

A indicates "lower extensions, left"
B indicates "lower extensions, right"
C indicates "one upper extension, left"
D indicates "dot or cross"
E indicates "zero axis crossings equal to or gretter than nine"
F indicates "two upper extensions, left"

In the table, a 1 indicates a positive requirement toward identification of a word and a *zero* indicates an exclusionary requirement, i.e., a 0 occuring for any particular test requires that the test be answered in the negative for the word under consideration. A dash line indicates that the test is not necessary for a decision for that particular word. Some of these indefinite cases are provided to take care of careless writing. For example, the "top extension, left" test C need not be applied to the word *five*. Thus, a carelessly written, short upper loop of an *f* in *five* is acceptable yet is not determinative. This is not the case for a *four*, however, since the upper extension test is required for an effective separation of the word *four* from the word *zero*.

It should be appreciated that the truth table of FIG. 4 is by no means minimal but rather reflects a state of compromises which allows for a maximum of variation in writing styles while tending to minimize the instrumentation complexities. Other tests may be added, of course, to provide additional redundancy for the limited ensemble of words shown and, in the case of larger ensembles, the additional tests may become essential to proper identification. Tests for other ensembles may be tabulated in a similar fashion.

The six bits of information indicated by the observations set forth above and tabulated in the truth table may be collated and analyzed by means of a configuration of decision elements such as electronic gates, relay contacts, or the like. By way of example, a plurality of electrical contacts which may be associated with six electromechanical relays (A through F) are shown schematically in FIG. 5 in a suitable configuration. Here the contacts in the relay tree correspond to the conditions set forth in the table of FIG. 4. Only one path between common input terminal 51 and one of the output terminals 52*n* may exist at any one time; a closed path between input and output identifies that one word in the ensemble specified by the coded sequence of tests A through F. For the relay tree shown in FIG. 5 the word *one* is indicated by the relay contact positions as shown.

Apparatus constructed to implement the logic tests as set forth in a truth table must be sensitive not only to the spatial distribution of the characteristic features of the words, but also to the time sequence in which the information is accumulated. Collation of the elements of written script into a time sequence of events in accordance with a preassigned schedule is readily obtained with the circuit schematically shown in FIG. 6. Once again electromechanical relays are shown as the decision elements merely to simplify the drawing and to permit the operational characteristics to be emphasized. Apparatus is shown for completely processing an ensemble comprising the ten decimal digits. It utilizes only ten decision elements and a zero axis counter. Other decision elements representing similar metrics can, of course, be added for more extensive word ensembles.

Although platen 121 and stylus 122, shown schematically in the drawing, may be positioned at any remote point, the electrical connections and operation of the circuit remain the same regardless of their physical location. Operation commences by the application of a reset pulses to terminal 124, which pulse momentarily closes relay R1 and releases all other relays in the circuit. It does so by momentarily opening contact 61 associated with the relay R1 to remove the source of potential V from the holding bus 62. Hence, all relays held closed by virtue of their latching contacts are released. Additionally, the positive potential V from source 60 is connected through contacts 63 of relay R1 to reset counter 64. Once these actions have occurred and the reset pulse is removed, all relays remain in an unenergized condition and counter 64 indicates a count of zero. This set of conditions is shown in the drawing.

A word may now be written on the platen 121 by stylus 122 in accordance with the restraints described hereinabove. Stylus 122 is connected to the source of potential 60 and accordingly provides electrical connections between the source and those of the commutator bars 1 through 15 encountered by it as a word is written. These momentary connections are sufficient to actuate decision element relays in a definite time order.

As the writing proceeds, the counter 64 advances once for each zero axis crossing. Commutator bar number 8 is arbitrarily selected as the zero axis of the commutator so that an intersection of the stylus with this segment represents one axis crossing. A momentary encounter of bar 8 supplies potential from source 60 by way of the stylus to buffer relay R2 closing it momentarily. When closed, a voltage pulse is applied through contact 76 to advance the counter 64 one index position where it remains until another zero axis crossing occurs.

The fulfillment of the tests A through F outlined above is established at the conclusion of the writing interval by the conditions of relays R–A through R–F. Single-pole, double-throw contacts associated with these relays, not shown in the drawing of FIG. 6, are connected to form relay tree 50 which is shown in detail in FIG. 5. As pointed out above, the closed path extending from terminal 51 through the relay tree 50 to one of the output terminals 52*n* is indicative of the word written from the particular ensemble of words for which the circuit is programmed.

The relays R–A through R–F are energized in response to conditions A through F as follows:

Relay R–A is energized whenever commutator segments 2 or 3 in the lower sector of the platen are contacted before an axis crossing count of six has been reached. As the stylus contacts one of these elements, potential V is applied through diode 65, the winding of relay A and through diode 66 to ground through the movable arm of counter 64. Once energized, the latching contact 67 holds the relay closed. Latching contact 93 insures that R–A, once energized, remains so independent of the ultimate count accumulated by counter 64. In the event that more than five zero axis crossings are detected before segments 2 or 3 are first contacted, relay R–A is not energized. Thus, when the relay is energized, it indicates that a bottom extension has occurred in the left hand portion of the word, i.e., before five axis crossings have been detected. The diodes employed in the circuit prevent premature or incorrect energizations of the relays as a result of possible "sneak" paths in the apparatus.

Relay R–B, if energized after writing a word, indicates that a middle or right bottom extension has occurred in the writing of a word, i.e., rule B has been fulfilled. Relay R–B is energized should the stylus contact either commutator bar 2 or 3 after six axis crossings have been detected if no previous bottom extensions have been detected in the left portion of the word. Once energized, it is latched in the closed position by contact 68. In the event that a left bottom extension has been recorded, contact 67 prevents relay R–B from latching.

A top left extension corresponding to rule C is indicated by the energization of relay R–C. The relay is closed if segment 13 of the commutator is contacted and if the zero axis crossing count is equal to or less than five. Its energizing path is through blocking diode 70, the relay winding, diode 69 and the movable arm of counter 64. Latching contact 71 is provided to hold the relay closed once contacted. In the event that an axis crossing count of six has been reached the energizing path terminates in resistor 72. Its resistance is sufficient to limit the energizing current to a value such that pull-in is prevented but holding is permissible.

Test D for the presence of dots or crosses in the upper sector of the commutator may be made in a number of ways. One simple one depends on the fact that such marks are generally made after the rest of the word has been written, i.e., dots or cross marks are made by lifting the stylus after the final character of a word is written, and reapplied to the platen. Moreover, the reapplication is generally made in the upper sector of the writing surface. Thus, if the stylus contacts segments 6 or 7, for example, but fails to contact segment 9 before any of the segments above segment 9 are contacted, a dot or cross is assumed to have been written rather than the continuation of the previously formed character. Accordingly, whenever the stylus contacts segments 6 or 7, relay R3 is energized through resistor 80 and latches by means of contact 73. Additionally, contact 74 closes to arm relay R–D so that a subsequent stylus contact with any one of commutator bars 10 through 15 energizes relay R–D. If R–D is so energized, contact 75 latches it closed. Should commutator bar 9 be first contacted, however, i.e., contacted after bars 6 or 7 but before a contact with any one of bars 10 through 15, it is concluded that a continuous stroke is involved rather than an independent mark such as a cross or dot. Accordingly, the potential developed on bar 9 is used immediately to release relays R3 and R–D by applying potential V to the junction of the winding of relay R3 and resistor 80. Both terminals of the relay winding thus are at the same potential and the relay opens. Only if segment 9 is not contacted subsequent to a contact with segments 6 or 7 and prior to a contact with segments 10 through 15, are relays R3 and R–D permitted to remain energized.

The combination of relays R–D and R3 thus effectively detect a discontinuity between the trailing end of the cursive writing on the commutator and a subsequent dot, cross or line occurring in the upper sector. Relay R–D, if energized at the time that the decision is made regarding the identity of the word, holds contact D in the relay network 50 closed so that test D is fulfilled.

Relay R–E is provided to account for test E. It indicates an axis crossing count equal to or greater than nine. The relay is energized after commutator bar 8 has been contacted nine times, each contact being sufficient to momentarily energize relay R2, thus to advance the movable arm of counter 64 one step in the clockwise direction. Once a count of nine has been reached, relay R–E is energized since the positive potential appearing on the holding bus 62 is placed between relay R–E and ground through contacts 9 or 10 of the counter 64.

The presence of two rather than one vertical left extension in accordance with test F of the truth table is detected by the count-of-two circuit formed by relays R–F and R4. Relays R–F and R4 are normally in their open circuit conditions. If a contact is made with commutator segment 13, R–F will operate by virtue of the current path through diode 81, and relay R–F and the closed contact 82 on R4. Contact 82 shorts out the resistor 83 associated with relay R–F. This action indicates that an upper extension has been encountered. Contact 84 associated with relay R–F acts to hold the relay in an energized position. If and when segment 10 is contacted following the above sequence of action, diode 85 and closed contact 86 on relay R–F cooperate to energize relay R4. The holding contact 87 associated with R4 insures that the relay will be held closed. At the same time contact 82 associated with R4 opens whereby the short circuit is removed from resistor 83. However, since the value of the resistor 83 is such as to permit sufficient sustaining current to flow in the winding of relay R–F, the relay R–F remains energized.

Should the commutator bar 13 again be encountered following the preceding sequence of events, it is apparent that a second stroke, i.e., second upper vertical extension, has occurred in the upper sector of the commutator. However, relay R4 is now in the energized state and, if there have not been more than five axis crossings, the contact 88 associated with counter 64 is in the closed position. The contact 88 is opened once the movable arm associated with the counter 64 exceeds a count of five. A second signal produced on commutator bar 13, before an axis crossing count of six, passes through the still closed contact 88 and through a contact 89 and appears at the junction of the winding of relay R–F and resistor 83. It is thus effective to release relay R–F since the relay then has no potential difference between its terminals. When the stylus potential on segment 13 disappears, relay R–F is not re-energized. Should the second contact with bar 13 occur after an axis crossing count of five, contact 88 is open and relay R–F is not released. Consequently, if the second energizing of segment 13, indicating a second vertical extension occurs after a count of five, the detection corresponding to two upper extensions in the left or early portion of the word is not produced. Thus, for the condition of relay R–F not operated and relay R4 operated, a condition exists which uniquely specifies that rule F has been fulfilled. It is to be noted that the relay R–F operated, corresponds to a "not F" condition in the relay tree 50, and the relay not operated corresponds to the F condition.

After a word has been written on the writing tablet, the state of the contacts of the relays R–A through R–F in circuit 50 uniquely specifies one and only one of the words in the selected ensemble of words. A signal is produced at that one contactor 52*n* corresponding to the selected word. This signal is produced by applying a read pulse to terminal 125 thereby to energize relay R5. If desired, the read pulse may be derived from the stylus 122 as by momentarily touching the stylus tip (stylus potential V) to the terminal 125. Once energized, latching contact 91 holds the relay closed. Relay contact 92 is also closed when the relay is energized. It applies a suitable signal source, for example, a source of potential V′ to the input terminal 51 of the relay tree 50. The applied signal appears on that output conductor 52*n* indicative of the word previously written. Suitable indicator lights may be connected to the conductors 52 to provide a visual indication of the word identity. The conductors may, of course, supply input information to any one of a large class of machines.

As pointed out above, fully electronic apparatus using, for example, transistor multivibrators, gates and the like to perform the functions of relays of FIG. 6 may advantageously be employed in the practice of the invention. Operation with such construction is generally faster than that with relays. Nevertheless, relay construction is sufficient to provide operation fast enough to accommodate hand written material.

With the logic network of FIG. 6 using six bits of information, extremely high accuracy is obtained even for a wide variety of script style and size providing only that the mild writing constraints described above are observed. Since longitudinal resolution is absent from the writing platen, the manner in which cursive script is written on the tablet in that direction becomes immaterial, i.e., the individual script characters may be widely separated one from the other even though connected, or they may be crowded one upon the other. Final "up-swings" on words extending above the segment 8, as for the final letter *e* of the word *five* or *nine* or the like sometimes, though infrequently, inhibit the recognition of dots. Additional redundancy in the logic network may be employed to remove this source of errors if it is encountered in practice. Similarly, apparatus for detecting the fulfillment of additional tests may be constructed using techniques similar to those illustrated in FIG. 6.

By virtue of this flexibility, the ensemble of words selected for the detection and recognition may be made arbitrarily large. Moreover, there is no absolute limit on word complexity which may be accommodated by the apparatus of the invention. The ensemble of words may be composed as well of long and complex script configurations as by short simple forms. Indeed, the logic network may be programmed to detect single script letters of a selected alphabet of letters or Arabic numerals. In this case, the component strokes used in writing each individual character such as the full-up, full-down, and partial up strokes used in forming a cursive letter *b* are detected and analyzed to provide identification. In other words, the individual elements of each character are treated as are individual letters in full words in the apparatus described above.

Although this invention has been described in connection with a specific embodiment incorporating a particular type of detecting apparatus connected specifically for analyzing a particular word ensemble, various modifications and changes of the described and illustrated circuit arrangements which do not depart from the spirit and scope of the invention will be apparent to those skilled in the art.

What is claimed is:

1. Apparatus for identifying words composed of cursive alphabetical characters which comprises transducer means comprising a striated commutator-like surface, a conductive stylus by which words are written on said surface in the general direction of said striae, means for detecting selected sequences of signals developed in said surface as the several striae thereof are contacted by said stylus in writing a word, and means responsive both to said detected sequences of signals and to the relative times of occurrence of said striae contacts for producing an output signal indicative respectively of the word written on said transducer.

2. Apparatus for identifying words composed of cursive, connected alphabetical characters which comprises striated transducer means, a conductive stylus by which entire words are written on said transducer in the general direction of said striae, means responsive to signals developed in the several striae of said transducer resulting from contact by said stylus as a word is written on said transducer for detecting the order in which line portions of the individual letters of a word are formed in a direction transverse to said transducer striae, and means responsive to said signals developed in said several striae and to the time order in which said signals are detected for producing an output signal indicative of the word written on said transducer.

3. Apparatus for identifying words composed of cursive, connected alphabetical characters which comprises a striated transducer comprising a plurality of elongated conductor elements electrically separated one from another, a conductive stylus by which a word from a selected word ensemble may be written on said transducer, means responsive to signals developed in each stria of said transducer upon each contact by said stylus as a word is written thereon for producing indicia of stylus contacts with said stria, means responsive to the time sequence in which said indicia are developed in all of said striae together, and means responsive both to said indicia and said time sequence for producing a manifestation of the identity of the word written on said transducer.

4. Apparatus for identifying words composed of cursive, connected alphabetical characters which comprises a transducer, said transducer comprising a plurality of elongated conductor elements contiguously arranged in three longitudinal sectors, said elements being insulated one from another and said sectors together forming a writing platen, a conductive stylus energized by a source of potential with which words may be written on said platen to occupy said sectors according to the character formations, a plurality of voltage sensitive means connected respectively to the individual conductor elements of said platen for detecting contacts of said energized stylus with corresponding ones of said elements as a word is written on said platen, means for storing indicia of voltages detected in said elements in the order in which they are detected, and means for analyzing the stored sequences of indicia to produce a signal indicative of the identity of the word written on said platen.

5. Apparatus as defined in claim 4 wherein said means for storing indicia of voltages detected in said elements comprises a plurality of bistable elements which change from a first one of their stable states to the other in response to voltages detected on selected ones of said transducer elements, said bistable elements being connected to remain in said other state only in the event that said voltages are detected in accordance with a pre-assigned schedule.

6. Apparatus as defined in claim 5 wherein said bistable devices are interconnected between a common input terminal and a plurality of output terminals in mutually exclusive paths according to said pre-assigned schedule, one of said output terminals being provided for each word to be identified by said apparatus, and wherein said means for analyzing said stored sequences of indicia comprises means for interrogating the states of the bistable elements in all interconnections once a complete word has been written on said platen thereby to detect an interconnection in which all of said bistable devices are in preselected states.

7. Apparatus as defined in claim 5 wherein said bistable elements comprise electro-mechanical relays connected to be energized by potentials detected in said conductor elements, the contacts of said relays being connected in a network according to said pre-assigned schedule.

8. Apparatus for identifying cursive script formations of alphabetical letters comprising in combination a striated conductive writing surface, said surface being composed of a plurality of elongated conductor bars contiguously supported in an electrically insulated condition one from another to form a writing surface, said surface being separated into a plurality of longitudinal sectors by visually distinctive regions extending longitudinally in said surface, a conductive writing instrument by which cursive formations oriented predominantly in a direction transverse to said longitudinal bars may be written on said surface to occupy selected sectors of said surface according to the formation of the alphabetical letters involved, means for recording the relative times of traversals by said stylus over individual ones of said conductor bars, means for detecting the number of traversals of said stylus across at least one of said bars selected to represent the center line of said writing surface, logic circuit means programmed to detect selected combinations of sequences of time-ordered traversals of said stylus over selected conductor bars in selected sectors and the number of traversals of said stylus across said center line for each of a selected ensemble of letter formations, and means responsive to said detected combinations for producing indicia representative of the formations written on said writing surface.

9. Apparatus as defined in claim 8 in combination with means supplied with said indicia representative of the formations written on said conductive surface for producing coded signals representative respectively of cursive script formations taken from an ensemble of words of the English language.

10. Apparatus as defined in claim 8 wherein said means for recording the relative times of traversals by said stylus over individual ones of said conductor bars comprises a plurality of bistable decision elements, each one of which is energized respectively in response to a contact by said writing instrument with selected ones of said conductor bars.

11. Apparatus as defined in claim 10 wherein said logic circuit means includes means responsive to the instantaneous state of said decision elements.

12. Apparatus for automatically classifying cursive line trace formations written within a prescribed writing area comprising in combination, a striated transducer formed of fifteen conductor striae contiguously supported to form a writing surface, said conductor striae being insulated one from another and being separated into three longitudinal sectors by visually distinctive regions extending longitudinally in said surface, electrically conductive writing means for writing on said surface line trace formations composed of cursive, connected alphabetical letters forming words from a pre-established word ensemble. said words being written so that small letters such as *a*, *e*, and *o* occupy the center sector only, letters with top extensions such as *t* and *h* occupy both said center sector and portions of the upper sector, and letters with bottom extensions such as *g* and *z* occupy both said center sector and portions of the lower sector, a source of potential connected to said conductive writing means, a plurality of bistable decision elements connected to selected ones of said conductor striae for sensing a contact of said conductor striae by said writing means, said decision elements being conditionally arranged to change from one state to another in response respectively to sensed contacts, means interconnecting said decision elements for enabling selected ones of said elements in accordance with the number of detected traversals of one of said conductor striae representing the center of said writing area by said writing instrument in writing a word from said ensemble, means included in said interconnecting means for indicating the relative times at which said decision elements change state during the writing of a word on said writing surface, means for interrogating said decision elements after an entire word has been written on said surface for detecting prescribed relationships among said decision elements, a different one of said relationships being prescribed for each line trace formation in said word ensemble, and means responsive to said detected relationships for producing in response thereto unique activity indicative of that one formation in said ensemble so detected.

13. Apparatus as defined in claim 12 wherein said visually distinctive regions comprise conductor striae formed of longitudinal brass bars and wherein the remaining conductor striae in said transducer are formed of longitudinal copper conductor bars.

14. Apparatus for automatically reading cursive script comprising a striated conductive writing surface, a conductvie writing instrument, means for analyzing the sequences of signals representative of elements of script characters produced as said stylus contacts said surface in accordance with (1) the spatial positions of said character elements in a direction transverse to the orientation of the striae of said surface only and (2) in accordance with the time order in which said signals are produced, and means energized by said analyzing means for producing a manifestation of the identity of that sequence of script characters produced by said stylus in its contact with said writing surface.

References Cited in the file of this patent

UNITED STATES PATENTS

| | | |
|---|---|---|
| 1,311,384 | Drew | July 29, 1919 |
| 2,741,312 | Johnson | Apr. 10, 1956 |
| 2,889,535 | Rochester | June 2, 1959 |

FOREIGN PATENTS

| | | |
|---|---|---|
| 581,856 | France | Dec. 8, 1924 |
| 854,150 | Germany | Oct. 30, 1952 |